Figure 1:
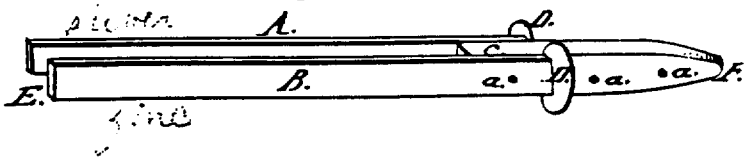

BEST AVAILABLE COPY

BEST AVAILABLE COPY

D. Harrington,

Battery.

№ 7668 X

Patented Jul. 22. 1833.

BEST AVAILABLE COPY

UNITED STATES PATENT OFFICE.

DANIEL HARRINGTON, OF PHILADELPHIA, PENNSYLVANIA.

GALVANIC FLUID APPLIED TO CURING CERTAIN DISEASES.

7,668 X

Specification forming part of Letters Patent No. ~~183~~, dated July 22, 1833.

*To all whom it may concern:*

Be it known that I, DANIEL HARRINGTON, of the city of Philadelphia, in the State of Pennsylvania, have invented a new and useful instrument or apparatus for the purpose of applying the galvanic electricity or magnetic fluid or influence as produced by the contact of different metals to the cure of certain diseases in the human system; and I do hereby declare that the following is a full and exact description of the construction of and the mode of operating with the said instrument or apparatus.

Any two different metals which excite the galvanic influence by contact may be used in the formation of this instrument; but I prefer for this purpose silver and zinc, and shall speak of them only, therefore, in my description.

The instrument is intended to be applied to the different external orifices of the human body, as the anus, the vagina, the nares, and the *meatus auditorius*, or orifice of the ear, for the removal of obstructions and the cure or relief of such diseases as may be beneficially treated thereby.

The particular instrument which I am about to describe is of a size and form which adapt it to the rectum in the adult patient. Those used for the nostrils or other purposes must, of course, be so varied in form and size as shall be best adapted to the purpose, the general principle of their construction being in all cases similar. They must also be suited in size to the age or other circumstances of the patient.

The accompanying drawing represents the instrument of two-thirds the full size of one of which I have had in actual operation. It consists, principally, of two pieces of metal separated by a bad conductor of electricity.

A and B are the two pieces of metal, each made in the same form. C is a piece of ivory, glass, resin, or any other bad conductors of the electric fluid. D D are flanges, collars, or projecting plates of metal, which stand at the distance of about two inches from one and five from the other end of the instrument.

The non-conducting piece C may be about one-fourth of an inch thick and from two to three inches long. Its width must be equal to that of the pieces of metal between which it is interposed. The general width of the pieces of metal A and B is about half an inch and their greatest thickness about one-eighth of an inch. The silver should be made much thinner—say one-thirtieth of an inch thick—for three or four inches in length toward the end E, in order that by its elasticity the two metals may be readily brought into contact with each other. The end from D to F is to be nicely rounded and tapered, as it is to be inserted into the rectum, and the faces of the collars or flanges toward that end should be somewhat convex and perfectly smooth, that it press without producing inconvenience upon the delicate membranes which surround the anus.

*a a a* are rivets or pins. of wood, which pass entirely through the two thicknesses of metal and the non-conductor to connect them together, cement also being interposed between the metals and the ivory to promote the same end. Screws of metal may be used for the same purpose provided they do not pass entirely through the non-conductor.

When this instrument is used, it should be dipped into olive-oil, and thence inserted by a gentle twisting motion until the flanges bear against the membrane, in which position it is to be held while it is in use. In order to produce the desired influence, the silver and zinc are to be alternately pressed together and suffered to recede. A succession of slight though perceptible shocks will be thus produced, and it will rarely happen that the application of the instrument in this way will not produce a dejection, even in cases when the constipation has been obstinate.

Experience has shown that, instead of the debilitating effects of ordinary cathartics, this application tends to give tone to the intestinal canal, and in this way to produce very happy results in cases of dyspepsia, habitual costiveness, and other complaints. By keeping the two metals in contact a continual influence will be produced, and this, when desired, may be increased by the use of a small galvanic pile or battery, the poles of which may be connected with the respective metals for ordinary purposes. This, however, is not necessary.

Figure 2:
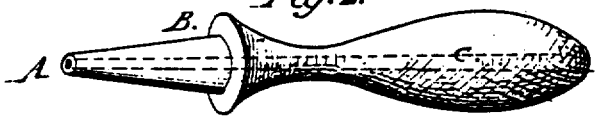

As an appendage to this instrument when used for operating through the medium of the rectum, I sometimes employ another, which, for an adult, may be in form such as is represented in Fig. 2, and about one-third larger.

This appendage may be turned out of ivory or hard wood, or it may be blown out of glass. The end A may be inserted in the same way with the end F′ of the first-named instrument, the collar or flange B serving to regulate it in the same way with the metal collar D. The handle part C may be of any convenient form. This appendage I perforate from end to end, as shown by the dotted lines. It will be found convenient sometimes to use this as introductory to the galvanic instrument, or occasionally after it, or alternating with it. By means of the perforation a syringe or injecting-pipe adapted to the larger end of the perforation may be used to inject oils or other fluids which, from a diseased state of the rectum or from other causes, may be required.

I am aware that galvanic circles have been and are now employed in different ways, or by inserting a small cylinder of zinc in the rectum and a piece of silver in the mouth, with a connecting-wire of silver between the two; and also by binding plates of zinc and silver on different and distant parts of the body after removing the cuticle and connecting such plates by a wire, as above, thus keeping up a continual action of the galvanic influence, or an action of many hours' duration. I do not therefore claim the application of such instruments; but What I do claim as my invention is—

The employment of two metals with a bad conductor of electricity interposed between them, in the manner or upon the principle herein described, for the purpose of producing for a shorter or longer period a succession of gentle shocks, for the purpose of removing obstructions or of producing other beneficial effects in cases of diseased action, by inserting and using the same, as directed, in any of the external orifices of the human body.

DANIEL HARRINGTON.

Witnesses:
ELI K. PRICE,
VALENTINE KENT.